United States Patent [19]

Mezger

[11] Patent Number: 5,725,941
[45] Date of Patent: Mar. 10, 1998

[54] POWDERED LACQUER FOR COATING SUBSTRATES SUCH AS AUTOMOBILE BODIES

[75] Inventor: Fritz Mezger, Goegglingen, Germany

[73] Assignee: Mercedes-Benz AG, Stuttgart, Germany

[21] Appl. No.: 522,113

[22] Filed: Aug. 31, 1995

[30] Foreign Application Priority Data

Aug. 31, 1994 [DE] Germany .................... 44 30 919.8

[51] Int. Cl.$^6$ .................................................. B32B 5/16
[52] U.S. Cl. .................... 428/327; 428/1; 428/212; 428/218
[58] Field of Search ........................ 428/213, 327, 428/212, 218, 1; 349/74, 98, 171; 252/299.01, 299.5

[56] References Cited

U.S. PATENT DOCUMENTS

| | | | |
|---|---|---|---|
| 4,246,368 | 1/1981 | Murase et al. | 525/117 |
| 5,362,315 | 11/1994 | Mueller-Rees et al. | 106/493 |

FOREIGN PATENT DOCUMENTS

| | | |
|---|---|---|
| 42 40 743 | 6/1994 | Germany . |
| 4301991 | 7/1994 | Germany . |
| 4307344 | 9/1994 | Germany . |
| 1570540 | 7/1980 | United Kingdom . |
| 2046765 | 3/1983 | United Kingdom . |
| 0 597 326 | 5/1994 | United Kingdom . |

*Primary Examiner*—H. Thi Le
*Attorney, Agent, or Firm*—Evenson, McKeown, Edwards & Lenahan P.L.L.C.

[57] ABSTRACT

The invention relates to a multi-layer coating for vehicle bodies which contains a plurality of different coating layers that differ from one another with respect to certain material parameter values and which separate on the substrate surface following their joint application and arrange themselves automatically layer-wise on the substrate surface in a sequence that is determined by the values of these material parameters. The top coating layer that settles automatically on top after application consists of either 1) plate-shaped interference pigments made of liquid crystalline side chain polymers which separate and automatically align themselves roughly parallel with the surface of the substrate, or 2) curable liquid crystalline polymers. The color phenomenon of this latter top layer is determined by the mesogens of the coating that have an interferential effect, are not crosslinked during coating application, and automatically align themselves roughly diagonally to the substrate surface. These mesogens automatically arranging themselves in a chiral-pneumatic fashion, forming a helix. The coating located in the lower layer is provided with color pigments with an absorbent effect, which are either black or the same hue as the hue of the color-determining interference pigments or helices in the top coating layer.

16 Claims, No Drawings

POWDERED LACQUER FOR COATING SUBSTRATES SUCH AS AUTOMOBILE BODIES

BACKGROUND AND SUMMARY OF THE INVENTION

The invention discloses a multi-layer coating system, such as a powder coating, for coating the surfaces of substrates, such as vehicle bodies, with a plurality of different coating layers, that differ with respect to certain material values and which separate on the substrate surface after their joint application and arrange themselves in layers automatically in a sequence that is determined by the values of these material parameters.

Known multi-layer coating systems can be formed based on powder coatings as well as solvent or water-based coatings. The polymers associated with the different coating layers must possess different affinity parameters, multi-layer parameters, and surface tension values, as each of these terms is defined in Murase, British Patent No. 1,570,540, in order for the individual layers to separate after application to the substrate surface.

One advantage of such multi-layer coating systems lies in the fact that the application of coating layers can be optimized in a single application step. Therefore, the external top coating layer should be especially resistant to scratching and chemical influences, while the lower coating layer, the one nearest to the substrate, should provide good corrosion protection for the substrate and adhere firmly to it. Furthermore, when multi-layer coatings are used to paint motor vehicles, it is important for the layers of coating that provide the color to be protected against the weather and scratches by a clear coating, especially when the coating layer that determines the color contains metallic pigments. Related art can be found in the following documents:

Luchtenberg, et al., Published German Patent No. DE 4,307,344, the entire disclosure of which is hereby incorporated by reference, discloses a polydiene oil-based paint binder obtained by reacting (A) a polydiene oil with (B) an ester of an unsaturated carboxylic acid and alcohol and/or a compound with activated double bonds, which undergoes radical polymerization to give polymers with liquid crystal (mesogenic) properties, and with (C) an unsaturated carboxylic acid and/or anhydride.

Brock, et al., Published German Patent No. DE 4,301,991, the entire disclosure of which is hereby incorporated by reference, discloses a modular system for the production of aqueous coating materials with an adjustable effect containing (A) an aqueous effect module containing effect pigments, anionically and/or non-ionically stabilized water-dilutable binders, organic solvents, water and optionally normal paint additives, and (B) an aqueous binder module containing binders as above, water and optionally organic solvents, crosslinkers and/or normal paint additives.

Murase, U.S. Pat. No. 4,246,368 (counterpart to Published German Patent No. DE 2,821,012), the entire disclosure of which is hereby incorporated by reference, discloses a powder coating composition for the production of multi-layer coatings, consisting of (1) a copolymer containing (a) a comonomer which imparts hardness, and (b) a comonomer which imparts softness, and (2) a resinous material, incompatible or only slightly compatible with the copolymer, which has an appreciably greater surface tension than the copolymer when melted at the same temperature, and which differs appreciably from the copolymer in the parameter for the formation of multi-layer coatings.

Murase, British Patent No. GB 1,570,540, the entire disclosure of which is hereby incorporated by reference, discloses a powder coating method for forming a multi-layer coating, wherein a resin powder mixture is applied to a surface to be coated, such that the applied resin powder mixture forms a multi-layer coating on the surface. The resin powder mixture comprises powders of at least two different resin materials, such that 1) the affinity parameter between the two resin materials is a value so that the two resin materials are incompatible or of low compatibility, 2) the surface tensions of the two resin materials in the fused state are different from each other, and 3) the two resin materials have different multi-layer parameters.

Murase, et al. British Patent No. GB 2,046,765, the entire disclosure of which is hereby incorporated by reference, discloses a slurry-like coating composition which comprises a mixture of a solid powder of an olefinic resin and an epoxy resin with a volatile organic liquid medium and which can be applied in a single coating operation to produce a multi-layer coated film composed of an upper layer of the olefinic resin and a lower layer of the epoxy resin.

Mueller-Rees, et al., U.S. Pat. No. 5,362,315, the entire disclosure of which is hereby incorporated by reference, discloses pigments whose color depends on the viewing angle, their preparation and use. These pigments comprise oriented three-dimensionally crosslinked substances of liquid-crystalline structure having a chiral phase and, if desired, further dyes and pigments, the further dyes and pigments if present not serving as base for the oriented three-dimensionally crosslinked liquid-crystalline substances having a chiral phase.

The present invention relates to the application of a multi-layer coating to paint objects such as motor vehicles. Separation of the applied coating into a plurality of layers is achieved by virtue of the fact that two or more polymers partially separate after application and/or heating, that is, they exhibit a concentration gradient. In this case, the polymer with the lowest surface tension will form the boundary layer with the air. Separation can occur 1) by virtue of the fact that two or more layers are incompatible before crosslinking, in other words, they form a mixed phase; and/or 2) by virtue of the fact that two or more layers are in fact compatible prior to crosslinking and form a monophase, but then separate as a result of, and during, crosslinking. In this latter case, the hardener should react equally rapidly with the layers. Separation is produced by incompatibility between the polymers, but this incompatibility must not be so great as to prevent adhesion between the layers. Additionally, the pigments incorporated in a particular coating layer must also exhibit very little or no affinity for the other coating layers.

One goal of the present invention is to improve powder coatings for objects such as vehicle bodies so that effect coating systems, whose color effects are based on interference phenomena, can be applied in a single or a small number of application steps.

This goal can be achieved according to the invention by applying a multi-layer coating, wherein the top coating layer, that settles automatically on top after application, consists of either 1) plate-shaped interference pigments made of liquid crystalline side chain polymers which separate and automatically align themselves roughly parallel with the surface of the substrate, or 2) curable liquid crystalline polymers. The color phenomenon of this latter top layer is determined by the mesogens of the coating layer that have a light interference (i.e. an interferential) effect, are not crosslinked during the application of the coating, and automatically align themselves roughly diagonally to the substrate surface. These mesogens automatically arrange themselves in a chiral-nematic fashion, forming a helix. The coating located in the lower layer is provided with color pigments with an absorbent effect, which are either black or the same hue as the hue of the color-determining interference pigments or helices in the top coating layer.

One preferred embodiment of the multi-layer coating system according to the present invention contains only the lower coating layer containing the absorption pigments and the top coating layer which produces the interference effect, so that any clear coating must be applied in a subsequent separate application step. This is advantageous when the quantity of coating per unit area that can be applied in a single application step must be limited to certain maximum amounts because of the risk of the liquid film sagging on the substrate surface. Additionally, when applying such coatings to vehicle bodies, the coating must flow readily and not be too viscous when applied. Otherwise, a so-called "orange peel" structure develops in the surface of the coating, which cannot be eliminated by superimposing a subsequent layer of clear coating, but at best can be smoothed out by costly polishing.

Other objects, advantages and novel features of the present invention will become apparent from the following detailed description of the invention.

DETAILED DESCRIPTION OF THE INVENTION

The invention makes use of a multi-layer coating system of the type referenced in the literature cited above, in which following application of a single layer, the applied material separates during the phase when it is still liquid into certain components, with the latter separating into different layers and forming a multi-layer liquid film. In this manner, for example, one layer with color pigments and a clear coating layer above it can be formed, which is desirable at least in metallic paints for protecting the metal pigments. Normally, the coating layer containing the pigment and the clear coating layer must be applied in separate application steps separated by a period of time. In the coating system used here, a single uniform application process is sufficient to create a plurality of layers with different functions. It should also be pointed out that the sequence of the individual layers to be formed by separation from the mixture is the same at all points in the substrate, in other words, the layer that contains pigment, for example, is always at the bottom, and the clear coating layer is always on the top. Even three different coating layers, and perhaps more, can be produced by a single spraying process.

A goal of the present invention is to provide a coating that can be applied in a single or a small number of application steps, meaning that apart from a preliminary priming, at least three layers required for effect coating systems, namely a lowest layer containing absorption pigments, a coating layer that determines color by interference, and a protective clear coating layer, are to be applied using fewer than three spraying processes. As previously mentioned, the multi-layer coating systems to be used here can not only be liquid coating systems, but also powder coating systems that can be applied dry and with a greater layer thickness than liquid coatings.

One advantage of the present invention is the simplification of the production process known as "painting" by virtue of the fact that a plurality of coating layers can be applied in a single application onto the substrate, preferably a vehicle body. Another advantage of the present invention is that two pigments with different affinities for the coating polymers can be incorporated in this manner. For effect pigments based on liquid crystalline polymers which require some type of cover coating, preferably on a black background, to produce the color effects, the present invention simplifies the situation in that not only the initial layers, but also a clear coating layer on top of the initial layers can be applied simultaneously. Pigments based on cholesteric liquid crystalline polymers are non-covering pigments in which, depending on the direction of the helix, circularly polarized light in a certain narrow-band wavelength range is reflected or transmitted. To create a color phenomenon, it is necessary that at least a certain portion of the transmitted light be absorbed. Therefore, the light that passes through the top coating is completely absorbed in the black background layer, and only the color of the narrow-band light reflected by interference (i.e. interferentially reflected) is visible. If the background layer is a certain color by virtue of incorporated colored absorption pigments, the result is a mixture of the light reflected by interference and the light reflected from the colored background layer. If the background layer is the same color as the color-determining interference pigments or helices in the top coating layer, an especially intensive color in only one hue results.

The desired color effect with a color appearance that depends upon the direction of viewing is achieved by adding interference pigments into the curable coating system of the Coating layer in question. The interference pigments themselves are made from a cured thin synthetic resin film of liquid crystalline polymers, which are ground to the pigment size after curing. However, it is important for the interferential color phenomenon that the coloration of the lower coating layer be black or one of the two color hues of the interference pigments, with absorption pigments being required in a lower coating layer in both cases.

Alternatively, the desired color effect can also be achieved by using liquid crystalline polymer synthetic resin in the color-determining coating layer, which is cured following application of the coating to the substrate. Such a coating film is not dependent on embedded pigments for a color phenomenon. For this embodiment, the polymer molecules contain mesogens that act interferentially and thus determine the color phenomenon of the coating. These mesogens are non-crosslinked when the coating is applied, and align themselves automatically transversely to the surface of the substrate during coating application, especially as a result of the coating separating as it flows parallel to the surface of the substrate. These mesogens also align themselves chirally and nematically during coating application and form helices in this arrangement. It is also essential in this case for the interferential color phenomenon, that the color of the lower coating layer be black or one of the two color hues of the color-determining interferentially acting mesogens of the top coating layer.

As for the interferential color effect of coatings produced by liquid crystalline polymers, the effective interferential color of the pigments that are transparent and colorless can be produced by virtue of the fact that in the smectic or cholesteric phases of the interference pigments, the lattice planes which are spaced equidistantly can be adjusted in terms of their lattice plane intervals to the wavelength of a specific color hue of the color determining coating layer. This can be accomplished by suitable chemical structure formation measures with regard to molecular architecture. The Applicant was able to present interference pigments with the basic color red and others with a basic color green. Advantageously, intermediate colors can be produced by virtue of the fact that different interference pigments are mixed jointly into a basic coating, with a color adjustment depending upon the mixing ratio of the different interference pigments. Since the mixing ratios can be varied continuously, all color shadings for the color basic hue can also be determined continuously.

The color basic hue of the interference pigments is determined by the color impression or the color that is perceived with perpendicular illumination of the coated surface and perpendicular viewing. Since, when the beam path is directed diagonally to the surface, the lattice plane intervals, due to the geometry, appear changed from the orthogonal beam direction, the color impression shifts towards another color that is shifted in the color spectrum and this depends on the relative direction of the illuminating beam to the surface and on the relative viewing direction of the surface. In other words, depending on the position of a certain part of the surface relative to the beam path of the illumination or of the position of the viewer, the surface area appears in the basic color or in a different color. The Applicant was able to produce interference pigments with the basic color red and with which a color shift between red and green could be produced in the coating. In addition, other interference pigments could be prepared with which a color shift between green and blue could be produced.

The intensity of the colors that can thus be perceived increases with the darkness of the color of the primer which bears the color determining layer of the coating, but the color hue of the primer must be determined by color pigments that have an absorptive effect. This is based on the fact that the portions of the light that pass through the interference pigments are absorbed more or less completely by the dark primer, to an extent that increases with the darkness of the primer. The brighter the primer, the greater the portion of light that does not interfere and that is reflected back from the primer and is then superimposed on the portion of the light reflected by the interference pigments, so that this portion of the light seems more pale in its color intensity. Therefore, the lighter the primer, the less the color intensities of the basic color and the changed color. This reaches the point where no color effect at all can be achieved such as on chromed unfinished parts, for example, because a shift of the spectral intensity in the light cannot occur on a reflecting primer. The effect coating acts on them at all illuminating and/or viewing directions like a clear coating, provided it contains no absorption pigments.

It is important for the present invention that the interference pigments exhibit a high affinity for the binder that forms the top layer and that the absorption pigments exhibit a high affinity for the binder of the lower layer.

Multi-layer coating systems can be used as binder polymers which firstly exhibit different affinity parameters, multi-layer parameters, and surface tensions, and are also composed of:

1) self-crosslinking polymers and binder/hardener systems, and/or of 2) a plurality of mutually incompatible binder systems and a hardener, and/or of 3) a plurality of mutually compatible binder systems that are rendered incompatible by reaction with the hardener, and/or of 4) a plurality of binder/hardener systems, with the components of each binder/hardener system exhibiting a high affinity for one another and each exhibiting a very low affinity for the components of the other binder/hardener systems.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A multi-layer effect coating whose color effect is based on interference phenomena for coating a substrate surface with a mixture of coating materials that differ from one another in the values of their affinity parameters and multi-layer parameters and their surface tension values relative to air and relative to the substrate surface, wherein said coating materials, following joint application to the substrate surface, separate from the mixture and automatically arrange themselves on the substrate surface in a sequence of different coating layers which is determined by the value of at least one of said parameters and the surface tension value, wherein the coating comprises:

a) a top coating layer comprising plate-shaped color determining interference pigments from liquid crystalline side-chain polymers suspended in a paint vehicle, wherein the pigments align themselves roughly parallel to the substrate surface during separation from the mixture, and b) a lower coating layer interposed between the top coating layer and the substrate surface, said lower coating layer comprising color pigments with an absorbent action which are black or have a color hue corresponding to a hue of the color-determining interference pigments in the top coating layer.

2. The coating according to claim 1, wherein said coating is a powder coating.

3. The coating according to claim 1, wherein said coating is a coating for motor vehicle bodies.

4. The coating according to claim 1, further comprising a third coating material designed as a clear coating, said third coating material having different affinity and multi-layer parameters as well as different surface tension values with respect to air and with respect to the substrate surface than the other coating materials such that following joint application to the substrate surface the coating materials separate, and said third coating material automatically locates itself in an uppermost layer that is adjacent to the air.

5. The coating according to claim 1, wherein the interference pigments have a thickness of about 3 to 15 µm.

6. The coating according to claim 1, wherein the plate-shaped interference pigments have a diameter of about 5 to 100 µm.

7. The coating according to claim 1, wherein the plate-shaped interference pigments have a diameter of about 10 to 50 µm.

8. A coating for coating surfaces of substrates with a mixture of a plurality of different coating bodies that are different from one another with regard to the values of their affinity parameters and their multi-layer parameters and in regard to their surface tension relative to air and relative to the substrate surface, and with said coating bodies, following joint application to the surface of the substrate, separating from the mixture and automatically arranging themselves in a sequence, layer-wise, on the substrate surface that is determined by the values of these parameters and/or the surface tension values, the coating comprising:

a) a top coating layer comprising curable liquid crystalline polymer or a mixture of various liquid crystalline polymers, with a color appearance of the coating determined by interferentially acting mesogens of the coating body which are non-crosslinked during the coating application and automatically align themselves approximately diagonally with respect to the substrate surface, said mesogens having the property of arranging themselves automatically in a nearly chiral-nematic fashion on the substrate surface when applied and forming a helix, and b) a lower coating layer interposed between the top coating layer and the substrate surface, said lower layer comprising color pigments with absorbent action which are black or have a color hue corresponding to a hue of the color-determining interferentially acting mesogens of the liquid crystal polymer or liquid crystal polymers of the top coating layer.

9. The coating according to claim 8, wherein said coating is a powder coating.

10. The coating according to claim 8, wherein said coating is a coating for motor vehicle bodies.

11. The coating according to claim 8, further comprising a third coating layer designed as a clear coating, said third coating layer contained in the coating which differs from the values of the other coating bodies with regard to its affinity and multi-layer parameters as well as its surface tension values with respect to air and with respect to the substrate surface in such fashion that following joint application to the substrate surface and separation, said body third coating layer automatically locates itself in an uppermost layer that is adjacent to the free atmosphere.

12. The coating according to claim 8, wherein the helix of the liquid crystalline polymers have a pitch which are thermally influenceable, with the liquid crystalline polymers being selected firstly in such fashion that they are thermally non-crosslinkable and secondly being selected in such fashion that the temperature level at which the pitch of the helix can be influenced is above the temperature at which the substrate to be coated is used.

13. A coating composition for coating a substrate surface, said coating composition comprising a mixture of coating materials that differ from one another in value of at least one parameter selected from the group consisting of affinity parameters and multi-layer parameters such that following joint application of said coating materials to the substrate surface, the coating materials separate and automatically arrange themselves in a sequence of different coating layers determined by the differing values of said parameters and form a coating comprising:

a) a color coating layer comprising color-determining elements, said color-determining elements being selected from the group consisting of:
   i) plate-shaped interference pigments from liquid crystalline side-chain polymers, and
   ii) curable liquid crystal polymers or polymer mixtures with a color appearance determined by interferentially acting mesogens which are non-crosslinked during application of the coating composition and automatically align themselves diagonally with respect to the substrate surface, said mesogens having the property of arranging themselves automatically in a substantially chiral-nematic fashion on the substrate surface when applied and forming a helix; and b) a lower coating layer interposed between the color coating layer and the substrate surface, said lower coating layer comprising color pigments with an absorbent action which are black or have a color hue corresponding to a hue of the color-determining elements in the top coating layer.

14. A coating composition according to claim 13, wherein said coating materials differ from one another in their surface tension relative to air and relative to the substrate surface.

15. A coating composition according to claim 13, wherein said coating further comprises:

c) an uppermost clear coating layer over said top coating layer.

16. A coating composition according to claim 13, wherein said coating is a powder coating.

* * * * *